Aug. 26, 1958     S. KAUFMAN     2,849,076
SEISMIC EXPLORATION AND RECORDING SYSTEM
Filed July 18, 1955     3 Sheets-Sheet 1

INVENTOR
SIDNEY KAUFMAN
BY
HIS ATTORNEY

INVENTOR
SIDNEY KAUFMAN
BY
HIS ATTORNEY

United States Patent Office 2,849,076
Patented Aug. 26, 1958

2,849,076

SEISMIC EXPLORATION AND RECORDING SYSTEM

Sidney Kaufman, Houston, Tex., assignor to Shell Development Company, New York, N. Y., a corporation of Delaware Application July 18, 1955, Serial No. 522,804

4 Claims. (Cl. 181—.5)

This invention pertains to a seismic method of exploration wherein seismic waves are generated by dropping a weight on the ground. The invention relates particularly to an improved system for reproducibly recording and re-recording said seismic waves to produce synchronized composite seismograms.

A conventional method of producing seismic waves consists in exploding a charge of dynamite. This charge is usually exploded underground, although it is also known to explode dynamite charges suspended in the air. The detonation of a buried dynamite charge produces seismic waves having a wide band of frequencies known as the dynamite spectrum. After suitable filtering, waves of the dynamite spectrum can usually be recorded in the form of a seismogram which yields upon analysis valuable information regarding underground formations.

However, it has been noted that in some locations, such as in west Texas, on the so-called Edwards Plateau, and in other places, the detonation of a dynamite charge fails to yield a good seismic record. Some improvement can be obtained by the simultaneous detonation of a group of charges, but the practical limitations in drilling sufficient shot points and handling the dynamite are serious, while charges exploded in the air entail undesirable effects, such as air noise, and moreover often do not transfer to the ground sufficient energy to produce intelligible reflections from deep layers.

A relatively low energy input is likewise characteristic of those seismic exploration methods wherein seismic waves are generated by dropping a mass or weight from a certain height onto the ground. Thus, a weight of 25 lbs. dropped from a height of 5 ft. transfers to the ground only the same energy as the explosion of a single dynamite cap buried to a depth of 18 inches, while the effect derived from dropping 3 tons throughout 30 ft. is equivalent to that of exploding 1/20 lb. of dynamite. This energy input is however sufficient for seismic exploration purposes, provided a favorable ratio of wanted or useful energy to unwanted or random energy is maintained, as will be explained hereinbelow.

It is therefore an object of this invention to provide a seismic exploration method whereby energy is transferred to the ground by dropping a weight thereon to generate seismic waves under conditions capable of producing significant records through means comprising a plurality of detectors connected to a suitable recording system.

It is also an object of this invention to provide a method comprising the steps of introducing energy into the ground by repeatedly dropping a mass thereon at the same or adjacent locations, reproducibly recording the seismic waves generated at each drop, and subsequently reproducing and combining said records in such a manner as to obtain a composite or cumulative record having properties and characteristics related to the wanted or useful energy transferred to the ground by said successive falls of the mass, the effects due to unwanted or random energy being made to cancel each other.

It is also an object of this invention to provide a seismic exploration method of the type defined above, and a recorder therefor, said recorder comprising means for forming separate reproducible records of the individual trains of seismic waves generated at each successive drop of a mass onto the ground, means for temporarily storing said records on separate tracks, and means for subsequently re-recording said records in any desired group combination, so as to form one or more composite records, said recorder being provided with means for automatically adjusting the beginning of each separate recording to a single reference moment, or point, whereby all of said separate recordings are brought into synchronism when being re-recorded, and the effect of phase-time differences of the individual records on the cumulative or ultimate record or records is substantially eliminated.

It is also an object of this invention to provide a system wherein recording of the type defined hereinabove is preferably effected by magnetic means.

These and other objects of the present invention will be understood from the following description taken with reference to the attached drawings, wherein.

Generally, the present system comprises the following main component parts: (1) a weight hoisting and dropping apparatus; (2) an array of seismic detectors; (3) a recording apparatus.

Figure 1:
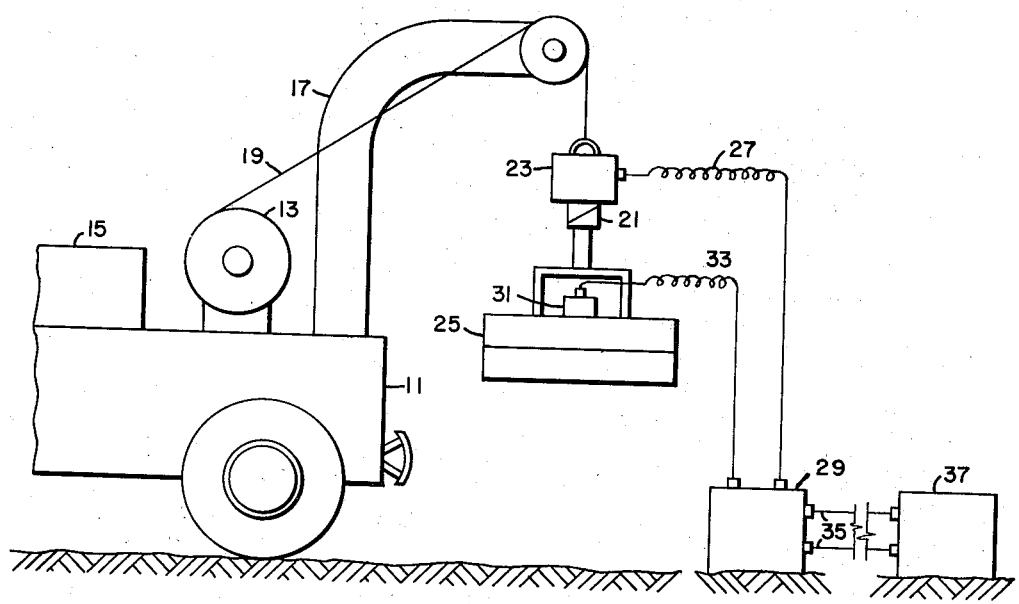
Figure 1 is a diagrammatic sketch of the weight-lifting and dropping apparatus used in accordance with the present invention.

Referring to Figure 1, the hoisting equipment, which is preferably mounted on a truck or other vehicle 11, comprises a winch 13 driven by a motor 15, and a mast or hoist 17. Supported from the hoist 17 by means of a cable 19 is a clamp or catch 21 controlled by a trigger or release mechanism 23. Suspended from the catch 21 is a heavy mass 25. The release mechanism 23 is electrically connected by a lead 27 to an energizing or control unit 29, whereby the catch 21 can be electrically triggered, in well-known manner forming no part of this invention, to drop the mass 25 onto the ground at the moment selected by the operator. The mass 25 has preferably a weight such as from 2 to 5 or more tons, and may be conveniently made of iron or steel plates suitably clamped together. The mass 25 carries a seismic or inertia type switch 31 operating, in well-known manner, to open or to close two contacts at the moment when the mass 25 hits the ground and the deceleration force acting on said switch reaches a predetermined value, such for example as 30 g, or 30 times the force of gravity. The inertia switch 31 is connected by means of a lead 33 to the unit 29 which is in turn connected by means of wires 35 to a recording unit 37, more particularly shown in Fig. 3. In this manner, both the moment at which the mechanism 23 is actuated to release the mass 25, and the moment at which the mass 25 hits the ground can be accurately recorded.

The seismic waves generated by the impact of the falling mass travel through the ground to the seismometers or detectors where they are translated, in well-known manner, into electrical pulses or signals. The present invention is not dependent upon any particular array or distribution of the detectors over the ground, since many arrangements, including a rectilinear one, may be used with equal success. A preferred arrangement will be briefly discussed here by way of illustration.

Figure 2:
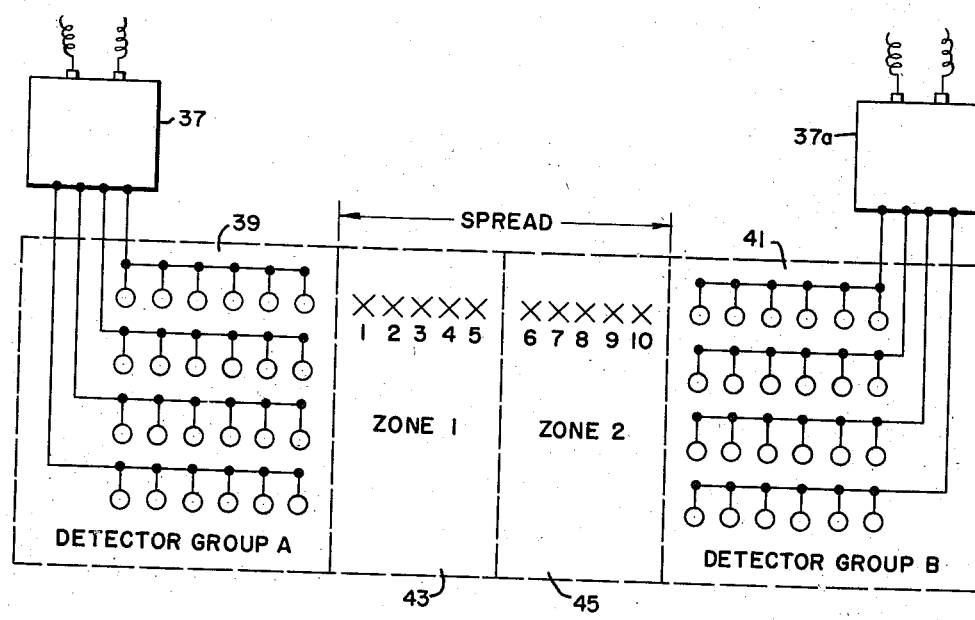
Figure 2 is a diagram indicating the distribution of the detectors and drop or shock points in the field.

As shown in Figure 2, a plurality of detectors 39, forming a group A, is connected to the input of the recorder 37, any desired form of parallel and/or series connection being used. The area 39 may vary in size from a fraction of an acre to several acres. A sufficient number of detectors, such as 12, 16, 64, 128 or more are used to provide for an adequate coverage of the area selected.

Separated from the area 49 by a distance of from a few hundred to several thousand feet is a second area 41 having thereon detectors forming a group B, generally similar to the group A. The detectors of group B are shown in Figure 2 as connected to a second recorder 37a. It is understood, however, that in practice a single recorder selectively connectable to detector groups A and B is normally used.

The distance separating area 39 from area 41 is herein referred to as a spread, wherein the weight 25 is successively dropped at a plurality of sites, such as indicated at points 1 to 10, inclusive. Each of these points may be separated from adjoining points by a distance such as from 5 to 50 feet or more. The spread may be subdivided into a plurality of zones, of which two are shown at 43 and 45 to simplify the drawing, although it is understood that each spread may normally comprise six or more zones. It is also understood that the weight 25, instead of being dropped at five points within each zone, may be dropped any desired greater or smaller number of times, and may moreover be repeatedly dropped at the same site or point.

Although any reproducible method of recording can be used for the present purposes, the magnetic method has been found to possess special advantages, and forms therefore a preferred recording method with regard to which the present invention will be described hereinbelow.

Figure 3:
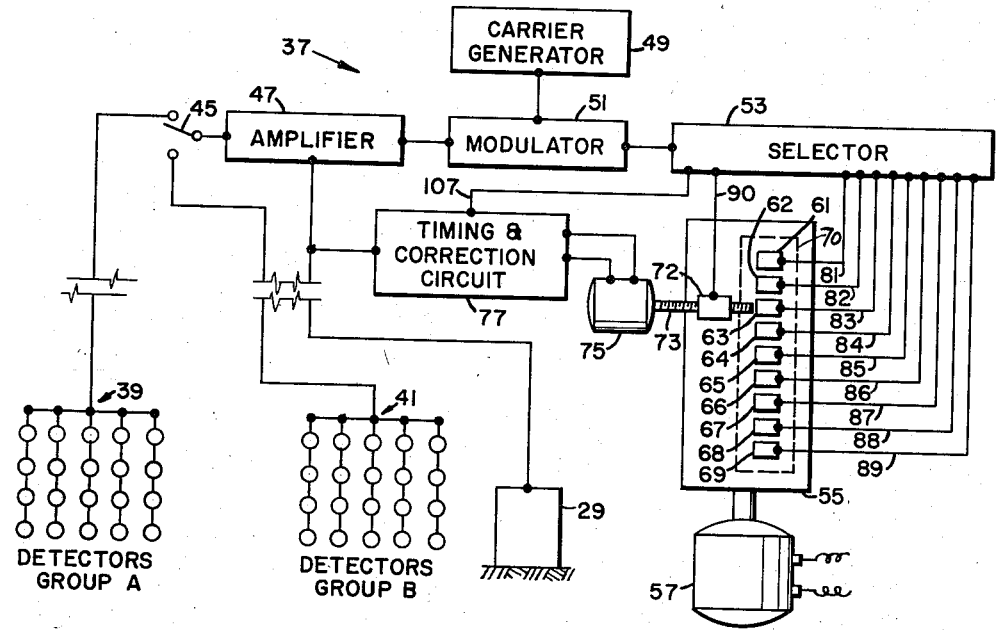
Figure 3 is a diagram of the recording system of the present invention.

Referring to Fig. 3, the seismometer or detector groups A and B of Fig. 2 are again shown at 39 and 41. The detectors are selectively connected through a two-way switch 45 to an amplifier 47, whereby the electrical pulses or trains of pulses produced by the detectors in response to seismic waves are suitably amplified, automatic gain control being preferably used in a manner well-known to the art. The output of the amplifier 47 is applied to the input of a modulator 51, which receives also the output of an oscillator or carrier generator 49. The function of the modulator 51 is to modulate, for purposes of magnetic recording, a high-frequency carrier wave, for example a 4–12 kc./sec. wave, with the amplified signals received from the detectors. The output of modulator 51 is delivered to the recording unit proper through a selector 53 comprising the desired combining and isolating circuits.

The recording unit comprises a drum 55 rotated at a constant speed by a motor 57. A magnetic recording tape of desired width, made of a material such as a flexible plastic, provided with a layer of a magnetically sensitive composition such as iron oxide, is suitably attached to the outer circumference of the drum 55 and rotates together with it.

Mounted along a line parallel to the axis of the drum 55 and closely adjacent to the tape stretched on the cylinder 55 is a plurality of fixed magnetic heads 61 to 69, supported by a frame member 70, indicated by a dotted line not to obscure the drawing. It is understood that although nine magnetic heads are shown in the drawing for purposes of illustration, any desired number, such as from 2 to 30 or more, may actually be used. The magnetic heads 61–69 are dual purpose heads, that is, they are capable of producing a record on a magnetic tape track and of picking such record up for purposes of re-recording.

It is understood that as the recording tape is rotated with the drum 55, any of the heads 61–69 can form thereon a recorded track representing the signals received from the detectors.

Mounted in a manner generally similar to that of the heads 61–69 and aligned with one of said heads, with regard to the track thereof, is a pick-up head 72. The head 72, which may, if desired, be also of the dual-purpose type, is adapted to move through a relatively short distance, of the order of 1 to 2 inches, along an arc closely adjacent the cylindrical outer surface of drum 55. This movement takes place along the track produced by head 62, and can be accomplished by any of a multiplicity of suitable mechanisms which form no part of this invention and are therefore merely indicated in the drawing by a lead screw 73 engaging the head 72 through suitable gearing and actuated by a motor 75 energized by the output of a timing circuit 77. (In Figure 3 pick-up head 72 is shown as being aligned with recording head 63 instead of 62. As described below, in this position a record made by head 62 on track 2 of drum 55 is re-recorded on track 3 by head 63.)

The magnetic heads 61–69 and 72 are electrically connected to the selector unit 53 by leads 81–90. Means supplying operating power to units 47, 49, 51, 53 and 77 are conventional in the art and are omitted to simplify the drawing.

Figure 4:
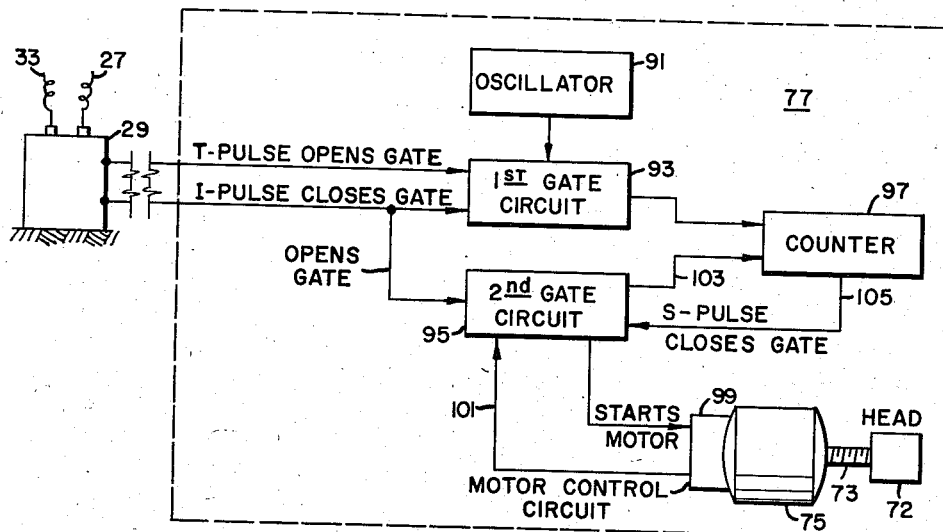
Figure 4 is a diagram of the timing and correction circuit 77 of Figure 3.

The timing circuit 77 is shown in detail in Fig. 4, and comprises an oscillator 91 generating pulses at a suitable frequency, a first gate circuit 93, a second gate circuit 95, a pulse counter 97 having a predetermined fixed maximum or overflow capacity, such for example as 1000 pulses, and a circuit 99 associated with the operation of the motor 75 driving the pick-up head 72.

The necessity for the timing circuit 77 arises from the fact that the essential feature of the present seismic exploration and recording method consists in reproducibly recording, re-recording and combining on a single or on a plurality of tracks, a plurality of seismic wave trains produced by repeatedly dropping a weight on the ground, as mentioned hereinabove. One of the main advantages of this procedure is that haphazard or chance effects, such as differences in the length and the character of the paths from the shock point to the different detectors, differences in the individual responses of said detectors to the seismic waves, differences in the amount and character of the energy transferred to the ground at each shock, etc., are cancelled or averaged out, so that only effects due to permanent and significant factors, such as the nature and the arrangement of subterranean strata, etc., are permitted to appear on the ultimate composite records. The ratio of wanted or useful energy to unwanted or random energy imparted to the ground is thus favorably improved.

It is, however, clear that in order to obtain a significant composite record by re-recording on a single track a plurality of wave trains each produced by a separate seismic shock and originally recorded on separate tracks, these original records must be synchronized in such a manner as to eliminate any phase-time differences therebetween.

In order to effect such a synchronization, it is necessary to correlate the separate records with regard to some basic time reference point. For example, in cases where the explosion of a dynamite charge is used to create seismic waves, such reference point may correspond to the impulse recorded at the break of the conductor filament serving to ignite the charge. In cases where seismic waves are created by the drop of a heavy mass, such reference point may be obtained by recording the pulse serving to trigger the mechanism 23 of Fig. 1, thus releasing the mass 25 and starting its fall.

In the latter case, however, matters are complicated by the fact that the time period between the moment when the mass 25 is triggered or released (which moment will be referred to herein as time or pulse T) and the time of the impact of the mass on the ground (which moment will be referred to herein as time or pulse I) does not have a constant value for successive falls of the mass. Because of various factors, such as unevenness of the ground, wind effect, statistical differences in the response of the triggering device to the releasing pulse, etc., this difference of time between pulses T and I exists and, although very small, is not negligible in seismic recordings where time values as small as one millisecond are of importance. In order, therefore, to eliminate phase time differences introduced by variations in the value of the I–T period, the synchronizing circuit 77 operates in the following manner.

Figure 5:
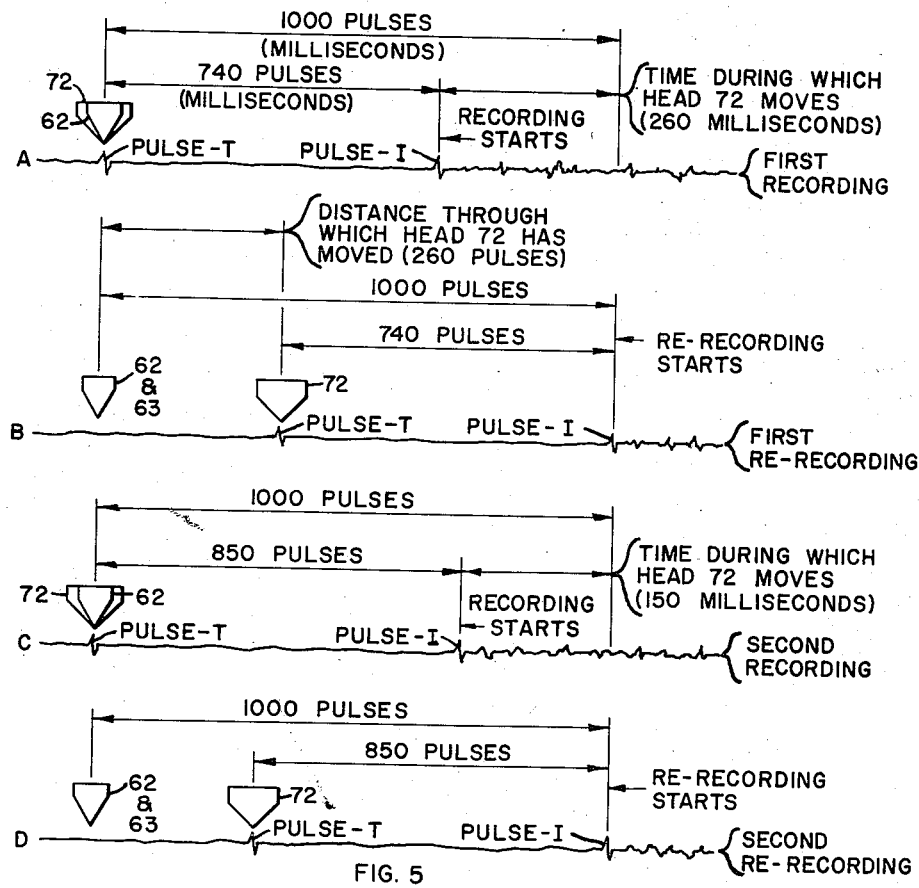
Figure 5 is a diagram illustrating a sequence of recording operations used in accordance with the present invention.

The triggering pulse T which releases the mass 25 from the latch 21 is transmitted from unit 29 to the recording system and recorded on a moving magnetic tape by the recording head 62 as shown on line A of Fig. 5. This same impulse is transmitted to the 1st gate circuit 93 of the timing and correction circuit 77 of Fig. 4, opening said gate circuit and permitting timing pulses to pass from the oscillator 91 to the counter 97. For purposes of illustration, it will be assumed that the oscillator 91 has a frequency of 1000 C. P. S. and thus delivers a pulse every millisecond. It will be also assumed that the counter 97 has a maximum storage or metering out capacity of 1000 pulses, that is the counter 97 "overflows" and delivers an output signal pulse after having stored 1000 timing pulses.

After the mass 25 has hit the ground, and an arbitrarily selected, constant amount of energy has been transmitted to the ground (as evidenced by the fact that the deceleration force acting on the mass 25 reaches some predetermined, arbitrarily selected value such as 30 g, as mentioned hereinabove), a pulse I is transmitted by the inertia mechanism 31 and recorded on the moving magnetic tape, as also shown on line A of Fig. 5. The pulse I is likewise transmitted to the 1st gate circuit 93, closing said circuit and thereby stopping the flow of timing pulses from the oscillator 91 to the counter 97. If, in the example used, the time period between pulses T and I has a value such as 740 milliseconds, the counter 97 has stored therein 740 pulses from the oscillator 91.

The pulse I is also transmitted to the 2d gate circuit 95, and opens said circuit, which has the effect of energizing the motor control circuit 99 and starting motor 75 to move the pickup head 72 with regard to the recording head 62 (to an ultimate position shown on line B of Fig. 5). The motor control circuit 99 simultaneously starts to transmit pulses through leads 101, the 2d gate circuit and line 103, to the counter 97. This transmission of pulses (and the motion of the head 72) continues until the total amount of pulses metered out or stored in counter 97 reaches its maximum capacity, at which point an "overflow" signal pulse S is transmitted by counter 97 over lead 105 to close the 2d gate circuit, thereby stopping the motor 75 and the motion of the head 72. Since, in the example selected, the capacity of the counter 97 was taken as 1000, and since the counter 97 had previously stored therein 740 timing pulses from oscillator 91, it follows that the head 72 was moved with regard to head 62 throughout the time necessary to supply 260 additional pulses to the counter 97, or, if the frequency of the unit 99 is assumed to be the same as that of oscillator 91, throughout 260 milliseconds.

When it is desired to transfer the record made on track 2 by head 62 to some other track, for example track 3, the following procedure is used.

The head 72, which is maintained in the position to which it was brought during the run on track 2, has its output connected through selector 53, to the head 63. When the recording drum 55 is started, the pick-up head 72 begins to scan the record on track 2, while the recording head 63 reproduces said record on track 3. Thus, since pulse T and pulse I were 740 timing pulses or milliseconds apart on track 2 (line A), they are likewise 740 pulses or milliseconds apart on track 3 (line B). Since, however, the pick-up head 72 has been displaced during the run on track 2 by 260 pulses or milliseconds with regard to head 62 (and therefore with regard to the new recording head 63), both pulse T and pulse I will be recorded on track 3 with a displacement equal to 260 milliseconds of drum travel time. Therefore, pulse I, which is herein identified for simplicity with the beginning of the recorded oscillations, will be re-recorded on track 3 (line B) exactly 1000 timing pulses or milliseconds behind the pulse T of the original track 2 (line A).

When, after re-recording on track 3 the signals created by the first fall of the mass 25, it is desired to record the oscillations created by a second fall of this mass, the following procedure is followed.

The head 72 is returned to its normal position with regard to head 62. The mass 25 is thereupon dropped a second time, and the events are again recorded on track 2 in the manner already described with regard to line A of Fig. 5, this second recording run serving to erase the record previously made on track 2 in a manner well-known in the art of magnetic recording.

Assuming that in case of the second drop the time interval between pulses T, and I, is 850 timing pulses or milliseconds, the events attendant the second drop are diagrammatically shown on line C. It will be seen that in this case the head 72 will be moved with regard to head 62 only during 150 timing pulses or milliseconds, that is, through a lesser distance than in the case of the first drop.

When thereafter it is desired to re-record the results of the second drop on some further track, for example, on track 4, the pick-up head 72 is operatively connected through selector 53 with the recording head 64, and the operations already described with regard to line B are repeated, giving the results diagrammatically shown on line D. It will again be seen that the pulses $T_1$ and $I_1$ are 850 timing pulses or milliseconds apart, and that pulse $I_1$ are re-recorded on line D, is therefore exactly 1000 timing pulses or milliseconds behind pulse T, as recorded on line C. In other words, re-recorded pulse I, of line D stands in exactly the same time relationship to recorded pulse T, of line C, as re-recorded pulse I of line B stands to the recorded pulse T of line A. The record of track 4 (line B) is therefore synchronized with the record of track 3. Now, when track 3 and track 4 are played back by fixed heads 63 and 64, the relative time difference between the two signals will be such as to compensate for the difference in the I–T differences as originally recorded. These two records may therefore be, if desired, combined into a single record, for example, on track 5, substantially without any phase-time distortion.

With the structural organization and operation of the present recording system in mind, a preferred method of carrying out seismic exploration in accordance with this invention may be briefly outlined as a series of steps relating to the particular arrangement of equipment shown in Figs. 1, 2 and 3 and using a recorder 55 having twenty-six or more recording heads and capable of recording twenty-six or more tracks:

(1) Track No. 1 is formed prior to the start of field operations, and carries the record of a standard calibrating wave, such for example as a 60 cycle, 1 volt wave. The record on track 1 is used during operations to check and to standardize the amplification with which individual records are produced on the various tracks during subsequent field operations.

(2) The weight 25 is dropped at point or site 1, zone 1. The seismic waves generated thereby, as translated into electrical oscillations by the detectors of group A, are recorded by head 62 on track 2. The timing and correction circuit 77 measures the time interval between pulses T and I and automatically brings head 72 to a proper spacing with regard to head 62.

(3) With the head 72 in proper position, the record is re-run. Head 72 picks up the record on track 2 and feeds its output to head 63, which records it on track 3.

(4) The weight 25 is again dropped at site 1, zone 1. The seismic waves picked up by the detectors of group B are recorded on track No. 2 as in step 2 above.

(5) This record is transferred from track 2 to track 8 as in step 3 above.

(6) The weight dropping apparatus is moved to site 2, zone 1. The weight is dropped there and is recorded on track 2 from detectors of group A as in step 2 above.

(7) This record is transferred from track 2 to track 4 as in step 3 above.

(8) The weight is dropped again at site 2, zone 1. A record is made from detectors of group B on track 2 as in step 2 above.

(9) This record is transferred from track 2 to track 9, as in step 3 above.

(10) These operations are repeated for successive drops at sites 3, 4, and 5 of zone 1. Records are in each case made from the responses of detectors of group A and then from the responses of detectors of group B. In each case, the record is made on track 2, and is then re-recorded on another track. The various tracks are in this way made to carry the following records:

Track 3—record from drop at site 1, detectors A
Track 4—record from drop at site 2, detectors A
Track 5—record from drop at site 3, detectors A
Track 6—record from drop at site 4, detectors A
Track 7—record from drop at site 5, detectors A
Track 8—record from drop at site 1, detectors B
Track 9—record from drop at site 2, detectors B
Track 10—record from drop at site 3, detectors B
Track 11— record from drop at site 4, detectors B
Track 12—record from drop at site 5, detectors B

(11) The records on tracks 3–7, inclusive, are simultaneously picked up by their respective heads and recorded all on track 13, which thus carries a composite synchronized record of the responses of detectors of group A to successive shocks in zone 1.

(12) The records on tracks 8–12, inclusive, are similarly picked up and recorded on track 14 to form a composite record of the responses of detectors of group B to shocks in zone 1.

(13) The operations above are repeated while dropping the weight at sites 6 to 10 and composite records for zone 2 are obtained in the manner outlined above, but are stored on track 15 and 16 instead of tracks 13 and 14.

It is understood that although the description hereinabove is related to an example involving only two zones of five sites in each, the present method can be successfully practiced on spreads comprising any desired reasonable number of zones, seismic waves being generated at any desired reasonable number of sites within each zone. Recorders with an appropriate number of heads are used in such cases. It is also understood that all disclosures made hereinabove with regard to numbers, sizes, arrangements of parts, sequences of steps, etc., should be taken as merely illustrative and may be modified in accordance with local conditions or particular problems pursued without departing from the spirit of the present invention.

It should likewise be borne in mind that although the synchronization of the recorded tracks in accordance with the present invention has been described as being performed electronically, and more specifically by means comprising the electronic circuits shown in Fig. 4, other electronic means and circuits may likewise be used for this purpose, as will readily occur in the light of the present specification to those familiar with electronics.

Figure 6:
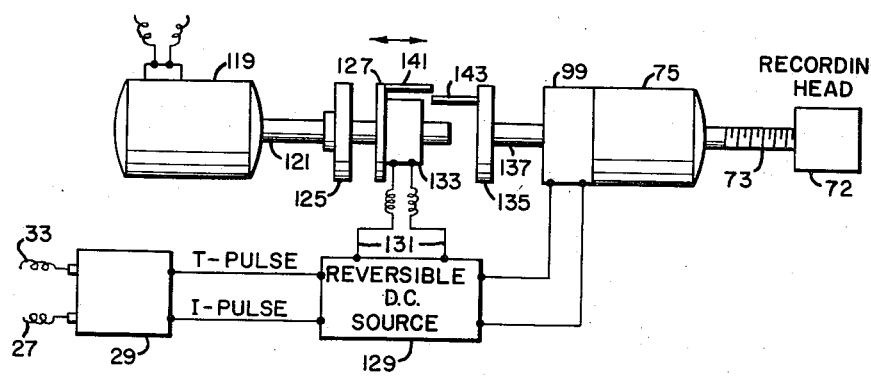
Figure 6 is a diagram illustrating a variation of the system of Figure 4.

Furthermore, means other than electronic, for example, mechanical means, may likewise be used for this purpose, as will be briefly outlined with regard to Fig. 6.

Fig. 6 illustrates diagrammatically a mechanical system whereby the time period between the T and the I pulses, for example, a period of $(I-T)$ milliseconds is measured, and a suitable positioning of head 72 is effected not by means of pulses stored by a counter 97, as in the system of Fig. 4, but as a result of the angular displacement of two rotatable members with regard to each other.

Fig. 6 shows a prime mover, such as an electric motor 119, capable of driving a shaft 121 at a constant speed. Fixedly connected to the shaft 121 is a magnet having the shape of a thin disc 125. Mounted on the shaft 121 for axial motion with regard thereto is a circular coil or second disc 127, which can be energized from a reversible D. C. source 129 through means such for example as leads 131 and slip rings 133.

A third disc or circular member 135 is fixedly mounted on a shaft 137, which is connected in axial alignment with the shaft 121, to the motor control unit 99 of the motor 75. This motor has a worm screw shaft 73 which drives the recording head 72, the elements 99, 75, 73 and 72 being identical with those designated by the same numerals in Fig. 4. The reversible D. C. source 129 is actuated by pulses T and I from unit 29 to energize the circular coil 127 in one direction (polarity) or the other, the resulting magnetic effect causing said coil respectively to engage or disengage the rotating magnet 125. When the circular coil 127 disengages the disc 125, it remains in said disengaged position and at a particular angular displacement until reset.

The discs 127 and 135 are provided with metallic pin contacts 141 and 143 respectively, positioned so and having an axial length such as to engage each other upon relative rotation when the circular coil or disc 127 is disengaged from the disc 125 and has moved to the right. The pins 141 and 143 do not contact, however, when the circular coil 127 has moved to its left-hand position in engagement with the disc 125, or has been reset.

The metallic pins 141 and 143, suitably insulated from the rest of the structure, form part of the electric circuit of the control unit 99 of motor 75 and operate to start or to stop the motor 75 upon engaging each other. For example, if motor 75 is at a given time driven through the control unit 99 from D. C. source 129, the pins 141 and 143 may, upon electrically contacting each other, stop said motor by energizing or short-circuiting a relay or other desired control element in the unit 129, in a manner well understood by electrical engineers.

The operation of the present system may be briefly described as follows:

Initially, the disc 125 is rotated at a constant angular velocity by motor 119; the pins 141 and 143 being in their reset position. The arrival of the T-pulse from unit 29 actuates the D. C. source 129 to energize the circular coil 127 with the proper polarity to cause said coil to engage the magnet disc 125, with which the disc 127 rotates throughout an angle determined by the time of arrival of the pulse I. Pulse I causes a reversal of the current from the source 129, whereby coil 127 is disengaged from disc 125 and moved to its right-hand position. The arrival of the pulse I also actuates the control circuit 99 to start the motor 75, thereby moving the recording head 72 axially by means of the worm screw 73. When the coil 127 is moved to the right, by the arrival of pulse I, its angular position and that of the pin 141, remains unchanged, that is such as determined by joint rotation with the disc 125. Now, when due to the rotation of disc 135 started by the pulse I, the pin 143 contacts the pin 141, the motor 75 is deenergized and the axial travel of the recording head 72 is stopped.

Thus, for example, if the angular speed of rotation of disc 125 is N degrees per second, the disc 127 having been engaged with disc 125 for $(I-T)$ seconds, would have rotated through an angle of $N(I-T)$ degrees, which is analogous to the time periods of 740 or 850 milliseconds used hereinabove to illustrate the examples of Fig. 5 pertaining to the operation of the system of Fig. 4. Furthermore, if the maximum possible angular displacement of the disc 135 is M degrees, the motor 75, before being stopped by the contact between the pins 141 and 142, would have rotated disc 135 through $[M-N(I-T)]$ degrees, which is analogous to the time periods of 260 and 150 milliseconds used in the aforementioned examples, said time periods being those throughout which the position of the recording head is changed.

I claim as my invention:

1. A system for reproducibly recording seismic waves generated by the fall of a mass on the ground, said system comprising a plurality of fixed recording heads and a movable pickup head, means comprising one of the recording heads for reproducibly recording an impulse corresponding to the start of the fall of said mass, means comprising the said one recording head for reproducibly recording an impulse corresponding to the impact of said mass upon the ground, means for measuring the interval between said impulses, means for metering out a predetermined interval, means for comparing said two intervals, and means for spacing the movable pickup head from the said fixed recording head by a distance proportional to the difference between said two intervals.

2. A system for magnetically recording seismic waves generated by the fall of a mass on the ground, said system comprising a magnetizable medium, a plurality of fixed recording heads positioned adjacent said medium to form a plurality of parallel tracks thereon, a movable pickup head aligned with one of the recording heads along one of said tracks, means comprising the fixed recording head aligned with the movable pick-up head for recording on the said track an impulse corresponding to the start of the fall of the mass, means comprising the said fixed recording head aligned with the movable pick-up head for magnetically recording on the said track an impulse corresponding to the impact of the mass upon the ground, means for measuring the time interval between said impulses, means for metering a predetermined time interval, said second interval being different from said first interval, and means actuated by said metering means for moving the pickup head along the said track throughout the period by which said second time interval differs from said first interval.

3. A system for reproducibly recording seismic waves generated by the fall of a mass on the ground, which system comprises a movable magnetizable medium, a plurality of fixed recording heads positioned adjacent said medium to form parallel tracks thereon, a movable pickup head aligned with one of the recording heads along one of said tracks, means comprising one of the recording heads aligned with the movable pickup head for reproducibly recording on said medium a first signal correspond to the start of the fall of the mass and a second signal corresponding to the impact of said mass on the ground, first pulse generator means for producing pulses at a constant frequency, electronic counter means having a capacity for storing a predetermined number of pulses, electronic circuit means actuated by the first signal to start the admission of said pulses to said counter and by the second signal to stop said admission, a motor actuated by the second signal to start moving the pickup head along its track, second pulse generator means actuated by said motor to produce constant frequency pulses during the operation of said motor, and circuit means connected between said generator means, motor and electronic counter to deliver said pulses to said counter and to stop said motor when the storage capacity of said counter is reached.

4. A system for reproducibly recording seismic waves generated by the fall of a mass on the ground, said system comprising a movable magnetizable medium, a plurality of fixed recording heads positioned adjacent said medium to form parallel tracks thereon, a movable pickup head aligned with one of the recording heads along one of said tracks, means comprising one of said heads for recording on said medium a first signal corresponding to the start of the fall of said mass and a second signal corresponding to the impact of said mass on the ground, mechanism comprising three axially aligned clutch elements, means for rotating the first clutch element at a constant speed, means actuated by the first signal to engage the first and second clutch elements and by the second signal to disengage these elements, thereby effecting an angular displacement of the second element proportional to the time interval between the two signals, a motor actuated by the second signal for moving the pickup head along its track, said third clutch element being rotatable with said motor, and circuit means comprising a pair of contacts mounted on the second and third clutch elements respectively and adapted to stop said motor on closing with each other, said closing being effected by the rotation of the third clutch element through an angle equal to a predetermined angle less the angle through which the second disc had been displaced during the interval between the first and the second signal.

References Cited in the file of this patent

Publication: "McCollum's Geograph," World Oil Magazine, vol. 138, No. 5, April 1954, page 46.

Palmer: "A New Approach to Seismic Exploration," World Oil Magazine, vol. 138, No. 7, pages 140, 142, 146, 148, 151, 152, and 154.